March 14, 1961 J. O. TRIMBLE 2,974,822
FLOAT FOR COVERING STORAGE BASINS
Filed April 1, 1958 2 Sheets-Sheet 1
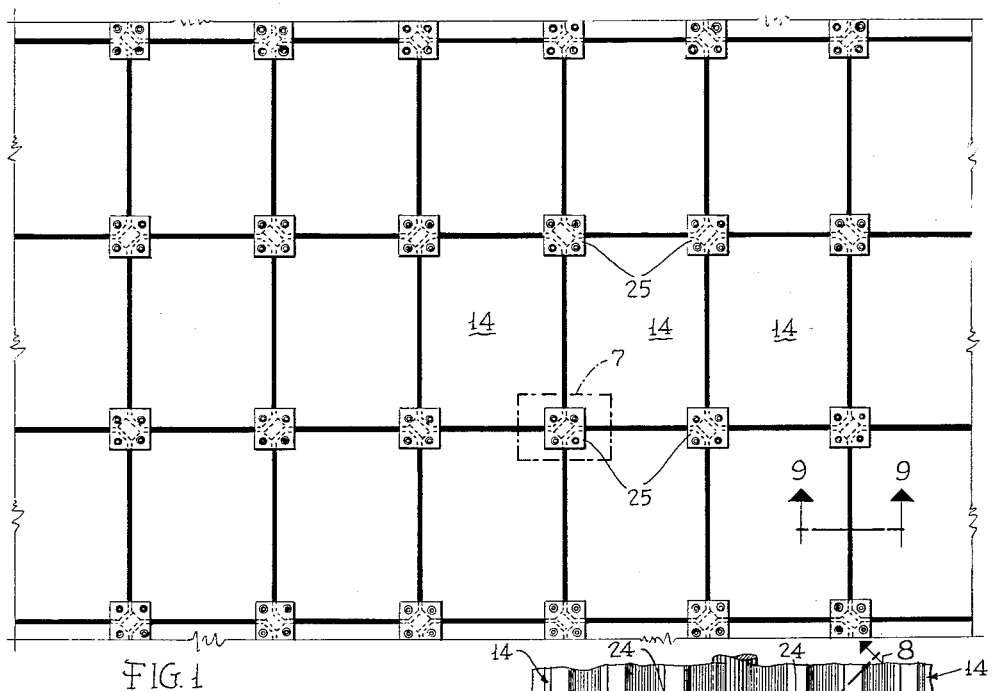
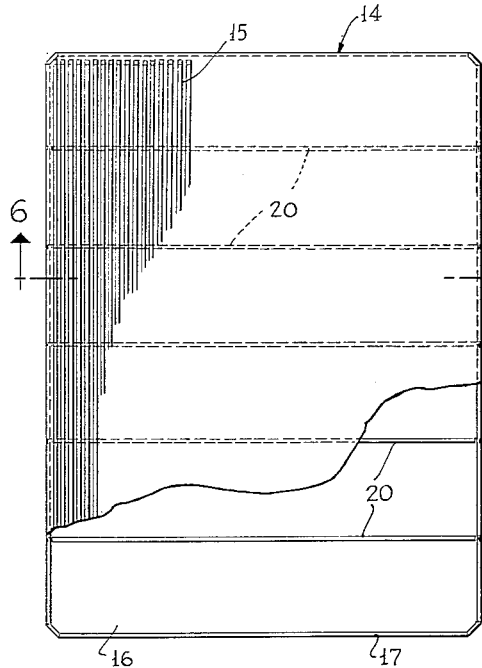
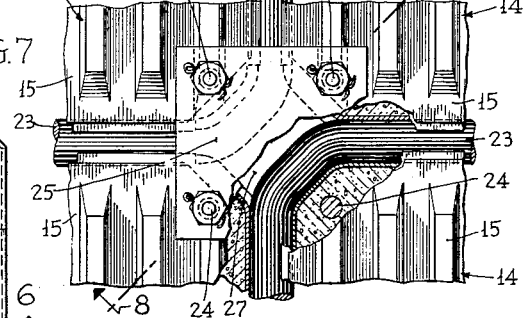
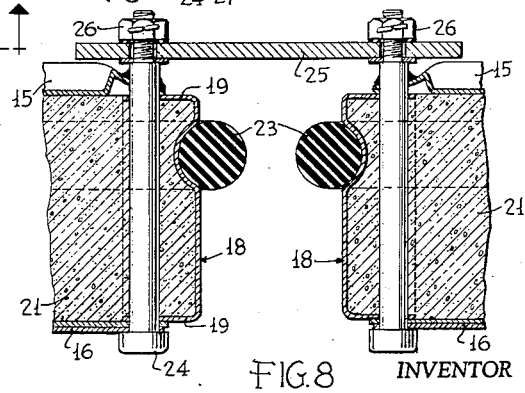
INVENTOR
John O. Trimble
BY *Karl L. Schiff*
AGENT March 14, 1961  J. O. TRIMBLE  2,974,822
FLOAT FOR COVERING STORAGE BASINS
Filed April 1, 1958  2 Sheets-Sheet 2
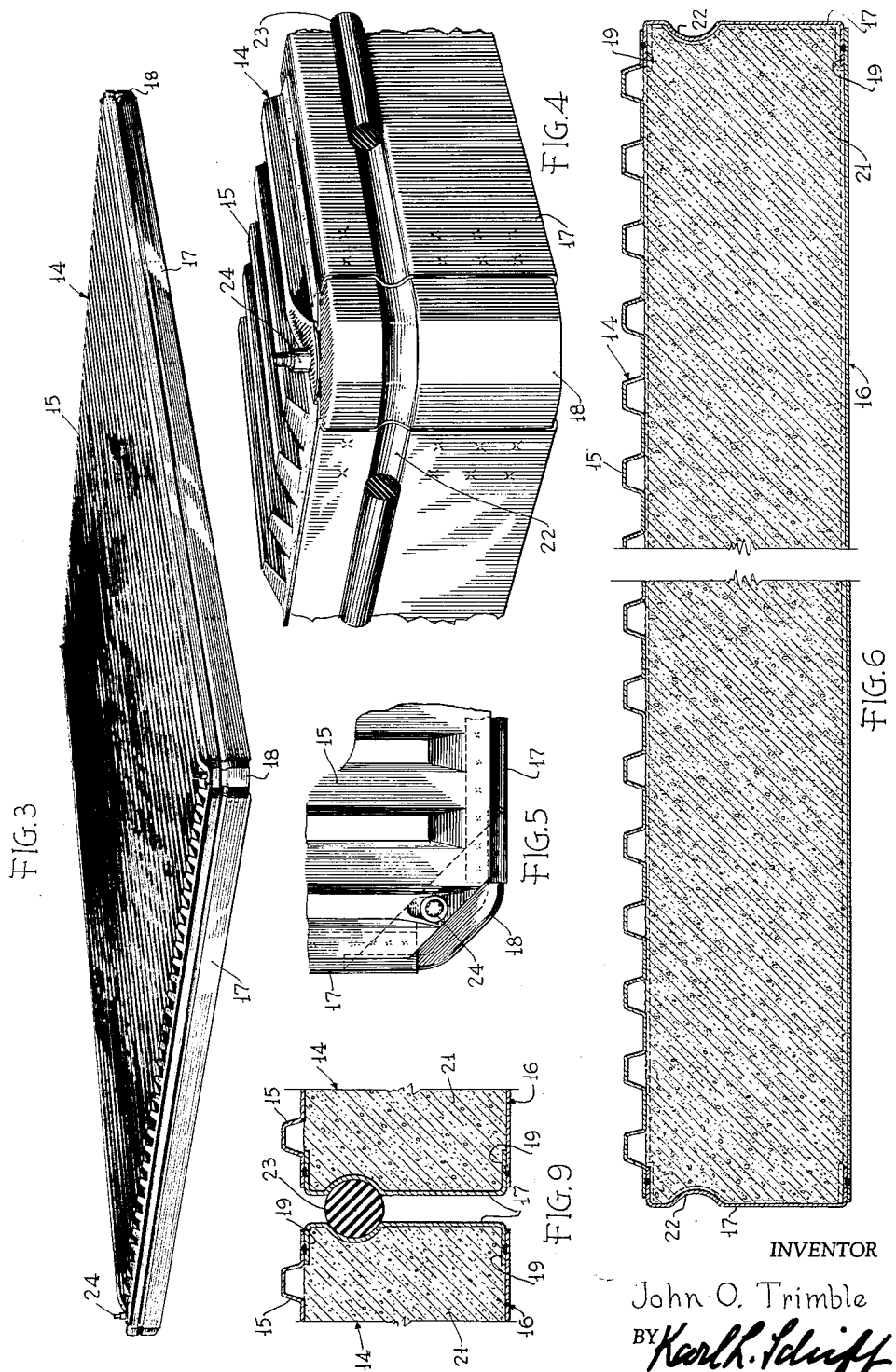
INVENTOR
John O. Trimble
BY Karl L. Schiff
AGENT

United States Patent Office 2,974,822
Patented Mar. 14, 1961

2,974,822

FLOAT FOR COVERING STORAGE BASINS

John O. Trimble, Havertown, Pa., assignor to The Budd Company, Philadelphia, Pa., a corporation of Pennsylvania Filed Apr. 1, 1958, Ser. No. 725,718

5 Claims. (Cl. 220—26)

The invention relates to floats destined particularly for covering open storage basins, lakes or ponds of liquids such as oil.

Among the objects of the invention are floats which are relatively inexpensive, easy to manufacture, to transport and handle; which are resistant to the influences of the fluid to be covered and of the atmosphere; and which will support equipment and persons for inspection and other purposes.

Further objects of the invention are floats which are fireproof and which prevent or greatly minimize evaporation of the liquid covered by them.

The aforesaid and other objects and advantages are achieved by constructing the float of thin sheet material, preferably stainless steel, having in itself insufficient strength to withstand the stresses imposed on it during handling and use, and by filling the interior of the thin-walled skin or hull with a solid body of a non-corrosive material of very small specific weight, preferably blocks of foamglass, thereby supplying the needed additional rigidity and strength.

The achievement of the objects and advantages of the invention is aided by providing the floats with good heat insulation qualities. This keeps the liquid underneath cool, reduces evaporation to a minimum and greatly minimizes the fire hazard of flammable liquids. Besides, any flames are necessarily restricted to the small spaces between the floats and can be reached and easily extinguished by personnel and fire fighting equipment moving over the floats.

The above outlined and further objects, features and advantages of the invention will be more fully and clearly understood from the following description of one embodiment of the invention and from the illustration thereof in the attached drawing.

In the drawing:

Fig. 1 is a small scale, diagrammatic, plan view of a plurality of floats arranged and interconnected in the manner in which they will ultimately be used;

Fig. 2 is a plan view, on a larger scale of one individual float;

Fig. 3 is a perspective, on a larger scale, of one individual float;

Fig. 4 is a fragmentary perspective, on a still larger scale, of the front corner of the float shown in Fig. 3;

Fig. 5 is a fragmentary plan view of the corner of the float shown in Fig. 4;

Fig. 6 is a fragmentary section through one float along line 6—6 of, yet on a larger scale than Fig. 2;

Fig. 7 is a fragmentary plan view of the adjoining corners of four floats showing on a larger scale substantially the region surrounded by dot-and-dash line 7 of Fig. 1;

Fig. 8 is a fragmentary section through two diagonally adjoining floats along line 8—8 of Fig. 7; and Fig. 9 is a transverse section through two adjoining floats, on the scale of Fig. 8, along line 9—9 of Fig. 1.

Each float 14 comprises a top wall 15 a bottom wall 16 and vertical walls 17 interconnecting the top and bottom walls. The individual side walls are truncated and interconnected by corner pieces 18. The side walls and corner pieces are of generally U-section facing inwardly, having flanges 19. These flanges are overlappingly connected, such as by spot welding, to the margins of top and bottom walls 15 and 16. The corner pieces 18 are also overlappingly connected, such as by spot welding, with the end portions of side wall members 17.

Top wall 15 is preferably of corrugated sheet metal having the ends of the corrugations flattened. The bottom wall 16 may be a plane sheet. The interior of the floats may be braced by vertical sheet metal bulkheads 20, diagrammatically shown in Fig. 2 and appropriately secured by marginal flanges or the like to the adjoining outer walls 15 to 17.

The interior of the metal hull formed by the members 15 through 18 is filled with a substantially rigid material 21, preferably foamglass.

Side walls 17 and corner pieces 18 have grooves 22 of about semi-circular cross section formed therein for the reception of resilient sealing strips 23 of rubber neoprene or the like. The strips 23 are closed rings which extend all around the periphery of each two diagonally opposite and adjoining floats. The other two diagonally opposite float units will be sealed on the sides without themselves carrying sealing strips. The sealing strips are held in place by their resiliency and by being stretched when applied. More strictly these side strips act primarily to keep the sides aligned—in a sense hinged together to turn about the strips—and to act as buffers between the sides than they do as actual sealing means.

Vertical bolts 24, passing through the corner pieces 18 and sealed thereto, have threaded, upwardly projecting ends which extend loosely through square anchor plates 25, the latter being held above the float units by shoulders on the bolts and by nuts 26.

The corner pieces 18 at each corner junction leave between them an opening 27 beneath the respective anchor plates 25. This opening, together with the space between the float units and the plates, serves for the drainage of fluid, particularly rain water, which might otherwise accumulate on top of the float.

The walls of the float consist preferably of medium hard stainless steel of the 18—18 austenitic type. Fluid-tightness is no indispensable condition because, as will become apparent, the filling 21 of the float supplies the necessary buoyancy.

For ease of handling it is contemplated to make the floats 9′ x 12′, 10′ x 10′, or 10′ x 15′ in plan view with a thickness of about 4.5″ or 5″ to 7″. The gauge of the peripheral walls of the float may be about .022. Bottom and deck, and transverse bulkheads if present, may have a gauge of .012.

The foamglass 21, filling the interior of the floats, has a specific weight of 9 pounds per cubic foot. This foamglass is preferably in the form of blocks which are available in sizes of 12″ x 18″ or 24″ x 18″ and in block thicknesses of 1″, 2″, 3″, 4″ or 5″. Tar or the like on the inside of bottom and top may serve to tie foamglass and hull together. Connection of the foamglass blocks among each other is not necessary.

The foamglass virtually completely occupies the entire inner space of the hull. Consequently, the float will retain its buoyancy even if water or other liquid should get into its interior and fill the small remaining voids left by the foamglass. Of course, the bubbles in the foamglass itself are completely closed and cannot be entered by liquid; the foamglass does not act like a sponge.

For the movement of equipment, such as fire fighting equipment, and of personnel it is particularly advantageous that the floats have no projecting margins and that the floats are so interconnected that they cannot tilt to any great extent but that the load imposed on one float is in part transferred to, distributed over and taken up by adjoining floats.

The invention is not restricted to the specific illustrated and described details but is susceptible to modifications and adaptations. Particularly the means for interconnecting adjoining floats and for sealing them against each other may vary. Furthermore different materials for the outer hull as well as for the filling of the floats may be used as long as they comply with the basic, hereinbefore outlined, requirements and characteristics. Obviously the floats need not be of rectangular shape, though this appears to be the most simple and economical shape.

What is claimed is:

1. A segmental float covering for a body of liquid, comprising a plurality of polygonal rectilinear-sided float units having adjacently positioned sides and meeting at a plurality of corner junctions in a symmetrical arrangement over the total area which is covered, each float unit being formed of vertically spaced bottom and top sheets connected on all sides by side walls, a light sheet-backing rigidifying buoyant liquid-excluding material filling the interior of said float units, the corners of said float units being truncated to leave free spaces at the junctions, a cover plate spaced above the float units over each open junction space, means loosely securing said cover plate to all of the float units at a junction to hold the units together, the sides of adjacent float units being spaced apart, and longitudinal strips disposed in the space between said sides, said strips being vertically narrow and in a single band to allow tilting movement between the sides of the float units.

2. A float covering as set forth in claim 1, further characterized by the fact that the sides of said float units are provided with facing grooves, and that a spacing strip is carried in the groove of the side of one adjacent unit and fits in the groove of the side of the other adjacent unit.

3. A float covering as set forth in claim 2, further characterized by the fact that a band of resilient elastic material is stretched around the periphery of diagonally opposite float units to form said side spacing strips.

4. A float covering as set forth in claim 1, further characterized by the fact that the outer covering walls of said float units, top, bottom and sides, are formed of stainless steel and the filler is foam glass.

5. A float covering as set forth in claim 4, further characterized by the fact that the bottom and top sheets are braced at intervals by spaced bulkheads between them and that the cover sheet is corrugated with the corrugations exposed at the top, and, the corrugations being bevelled down at the ends.

References Cited in the file of this patent
UNITED STATES PATENTS

| | | |
|---|---|---|
| 2,006,505 | Lentschewsky | July 2, 1935 |
| 2,007,193 | Griffin | July 9, 1935 |
| 2,023,308 | Cantacuzene | Dec. 3, 1935 |
| 2,819,476 | Dodge | Jan. 14, 1958 |
| 2,841,804 | Case | July 8, 1958 |
| 2,873,042 | Fino | Feb. 10, 1959 |